United States Patent
Hiremath et al.

(10) Patent No.: US 10,519,929 B2
(45) Date of Patent: Dec. 31, 2019

(54) SYSTEM AND METHOD FOR MINIMIZING ENERGY LOSS DUE TO YAW UNTWIST OF A WIND TURBINE

(71) Applicant: General Electric Company, Schenectady, NY (US)

(72) Inventors: Vijaykumar Muppayya Hiremath, Bangalore (IN); Steven Yi-Chi Kong, Mt. Ommaney (AU); Sri Praabhu Jayaraman, Bangalore (IN); Karthikeyan Appuraj, Hyderabad (IN)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 15/346,989

(22) Filed: Nov. 9, 2016

(65) Prior Publication Data

US 2018/0128241 A1 May 10, 2018

(51) Int. Cl.
*F03D 7/02* (2006.01)
*G05B 19/04* (2006.01)
*G05B 19/406* (2006.01)

(52) U.S. Cl.
CPC ........... *F03D 7/0204* (2013.01); *G05B 19/04* (2013.01); *F05B 2240/50* (2013.01); *F05B 2260/821* (2013.01); *F05B 2270/20* (2013.01); *F05B 2270/32* (2013.01); *F05B 2270/321* (2013.01); *F05B 2270/329* (2013.01); *G05B 19/406* (2013.01); *Y02E 10/723* (2013.01)

(58) Field of Classification Search
CPC ... F03D 7/0204; G05B 19/406; G05B 19/402; G05B 2219/2619; F05B 2260/821; F05B 2240/50; F05B 2270/321; F05B 2270/32; F05B 2270/20; F05B 2270/329

See application file for complete search history.

(56) References Cited

U.S. PATENT DOCUMENTS

| | | | |
|---|---|---|---|
| 8,058,740 B2 | 11/2011 | Altenschulte et al. | |
| 8,227,695 B2* | 7/2012 | Ueno | H02G 11/00 174/68.1 |
| 10,036,692 B2* | 7/2018 | Perley | F03D 1/06 |
| 2004/0151575 A1* | 8/2004 | Pierce | F03D 7/0204 415/1 |
| 2007/0116572 A1* | 5/2007 | Barbu | F03D 7/0224 416/132 B |
| 2008/0078228 A1* | 4/2008 | Nies | G01D 3/08 73/1.01 |

(Continued)

*Primary Examiner* — Mohammad Ali
*Assistant Examiner* — Kelvin Booker
(74) *Attorney, Agent, or Firm* — Dority & Manning, P.A.

(57) ABSTRACT

The present disclosure is directed to a method for minimizing energy loss caused by yaw untwist of a nacelle of a wind turbine. The method includes monitoring, via at least on sensor, one or more wind conditions near the wind turbine. The method also includes processing, via a controller, the one or more wind conditions for a given time interval. Further, the method includes monitoring, via the controller, a position of the nacelle. The method also includes triggering, via the controller, a yaw untwist operation when the position of the nacelle has rotated from an original position above a predetermined yaw threshold and the processed wind conditions are below a predetermined wind condition threshold.

17 Claims, 5 Drawing Sheets

(56) References Cited

U.S. PATENT DOCUMENTS

| | | | |
|---|---|---|---|
| 2010/0123314 A1* | 5/2010 | Menke | F03D 7/0248 290/44 |
| 2010/0135789 A1* | 6/2010 | Zheng | F03D 7/0224 416/1 |
| 2011/0049844 A1 | 3/2011 | Rosenvard et al. | |
| 2011/0133455 A1* | 6/2011 | Altenschulte | F03D 7/0204 290/44 |
| 2011/0211961 A1* | 9/2011 | Nies | F03D 7/0204 416/169 R |
| 2012/0027585 A1* | 2/2012 | Daniels | F16D 66/025 416/1 |
| 2012/0027589 A1* | 2/2012 | Haag | F03D 7/0204 416/1 |
| 2012/0133144 A1* | 5/2012 | Barton | H02G 3/32 290/55 |
| 2012/0134807 A1* | 5/2012 | Axelsson | F03D 7/0204 416/1 |
| 2013/0088009 A1* | 4/2013 | Cousineau | F03D 7/0204 290/44 |
| 2013/0099494 A1* | 4/2013 | Numajiri | F03D 7/0212 290/44 |
| 2013/0149146 A1* | 6/2013 | Sasseen | F03D 7/0204 416/1 |
| 2013/0253853 A1* | 9/2013 | Wunderlin | G05B 23/0283 702/42 |
| 2013/0259686 A1* | 10/2013 | Blom | F03D 7/0276 416/1 |
| 2013/0280066 A1* | 10/2013 | Scholte-Wassink | F03D 7/0296 416/1 |
| 2013/0336775 A1* | 12/2013 | Blake | F03D 1/0625 415/207 |
| 2014/0017079 A1* | 1/2014 | Grabau | F03D 7/0224 416/1 |
| 2014/0152010 A1* | 6/2014 | Larsen | F03D 7/00 290/44 |
| 2014/0152013 A1* | 6/2014 | Spruce | F03D 7/0204 290/44 |
| 2014/0154075 A1* | 6/2014 | Kristoffersen | F03D 7/0224 416/1 |
| 2014/0286778 A1* | 9/2014 | Moestrup | F03D 1/06 416/205 |
| 2015/0050143 A1* | 2/2015 | Kammer | F03D 17/00 416/1 |
| 2015/0056072 A1* | 2/2015 | Perley | F03D 7/0288 416/1 |
| 2015/0086356 A1* | 3/2015 | Perley | F03D 7/0292 416/1 |
| 2015/0167637 A1* | 6/2015 | Kooijman | F03D 7/02 416/1 |
| 2015/0361685 A1* | 12/2015 | Abreu | F03D 80/70 52/40 |
| 2015/0361960 A1* | 12/2015 | Agarwal | F03D 7/0204 416/1 |
| 2015/0377215 A1* | 12/2015 | Agarwal | F03D 7/044 416/1 |
| 2016/0068373 A1* | 3/2016 | Chin | B63B 27/10 414/138.1 |
| 2016/0138571 A1* | 5/2016 | Perley | F03D 1/06 702/43 |
| 2016/0237988 A1* | 8/2016 | Perley | F03D 7/0288 |
| 2016/0265509 A1* | 9/2016 | Movsichoff | F03D 1/06 |
| 2016/0333860 A1* | 11/2016 | Winslow | F16B 35/04 |
| 2016/0356266 A1* | 12/2016 | Koerber | F03D 7/044 |
| 2017/0356421 A1* | 12/2017 | Petitjean | F03D 7/048 |
| 2018/0017039 A1* | 1/2018 | Davoust | F03D 7/0204 |
| 2018/0058425 A1* | 3/2018 | Deshpande | F03D 7/046 |
| 2018/0066630 A1* | 3/2018 | Kristoffersen | F03D 7/0224 |
| 2019/0048848 A1* | 2/2019 | Glavind | F03D 7/0204 |
| 2019/0048849 A1* | 2/2019 | Grunnet | F03D 7/042 |

* cited by examiner

SYSTEM AND METHOD FOR MINIMIZING ENERGY LOSS DUE TO YAW UNTWIST OF A WIND TURBINE

FIELD OF THE INVENTION

The present disclosure relates generally to wind turbines, and more particularly to a dynamic system and method for minimizing energy loss due to yaw untwist of a nacelle of a wind turbine based on wind speed and/or direction.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers a wind turbine may change. The wind turbine may thus adjust the nacelle, e.g. through a yaw adjustment about a longitudinal axis of the tower, to maintain alignment with the wind direction. When the yaw angle of the nacelle is adjusted, however, cables extending from the nacelle down through the tower can become twisted. Particularly, when the nacelle is returned to its original position (sometimes referred to as yaw untwisting), the untwisting of the cables can take considerable time, e.g. up to 20 minutes. During yaw untwisting, the wind turbine is not producing power; therefore, time periods of untwisting of the wind turbine can cause considerable energy production loss.

Various attempts have been made to reduce the time it takes for yaw untwisting. For example, some past efforts have involved a static control methodology that operates based on two conditions, including limit switch activation and software control. In either instance, the yaw untwisting operation is triggered after two revolutions, which can still lead to production loss during the operating wind speed range.

Accordingly, improved systems and methods for yaw untwisting so as increase energy production would be welcomed in the art. In particular, systems and methods that provide dynamic yaw control of wind turbines based on wind speed and/or direction so as to reduce the time it takes for yaw untwisting would be desired.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for minimizing energy loss caused by yaw untwist of a nacelle of a wind turbine. The method includes monitoring, via at least on sensor, one or more wind conditions near the wind turbine. The method also includes processing, via a controller, the one or more wind conditions for a given time interval. Further, the method includes monitoring a position of the nacelle. Thus, the method also includes triggering a yaw untwist operation when the position of the nacelle has rotated from an original position above a predetermined yaw threshold and the processed wind conditions are below a predetermined wind condition threshold.

In one embodiment, the wind condition(s) may include an actual wind speed, a forecasted wind speed, an actual wind direction, a forecasted wind direction, or any other suitable wind condition.

In another embodiment, the step of processing the wind condition(s) may include determining an average wind condition for the given time interval as a function of the one or more wind conditions and determining whether the average wind condition for the given time interval is less than at least one of a predetermined yaw untwist wind condition or a minimum wind condition for the given time interval.

In further embodiments, the step of monitoring the position of the nacelle may include determining an angle of the nacelle measured from the original position. Further, the original position may correspond to a zero-degree north location of the nacelle. More specifically, in certain embodiments, the predetermined yaw threshold includes an angle of the nacelle ranging from about 360 degrees to about 720 degrees. In additional embodiments, the step of monitoring the position of the nacelle may include counting, via a yaw drive mechanism, a number of yaw bearing teeth of a yaw bearing that engage with a yaw drive pinion from the original position.

In another embodiment, the step of triggering the yaw twist operation may include untwisting, via the yaw drive mechanism, the nacelle of the wind turbine to its original position. In further embodiments, the method may also include determining whether the yaw untwist operation is complete and after completion, correcting the position of the nacelle for a turbine-level position gradient. In yet another embodiment, the method may also include transitioning to a previous state of turbine operation after completion of the yaw twist operation.

In another aspect, the present disclosure is directed to a method for minimizing energy loss caused by yaw untwist of a nacelle of a wind turbine. The method includes monitoring, via at least one sensor, a wind speed near the wind turbine. Further, the method includes monitoring a position of the nacelle. Thus, the method also includes triggering a yaw untwist operation when the position of the nacelle has rotated from an original position above a predetermined yaw threshold and the monitored wind speed is below a predetermined wind speed threshold. It should be understood that the method may further include any of the additional steps and/or features as described herein.

In yet another aspect, the present disclosure is directed to a system for minimizing energy loss caused by yaw untwist of a nacelle of a wind turbine. The system includes at least one sensor configured to monitor one or more wind conditions near the wind turbine and a controller having one or more processors communicatively coupled to the sensor(s). Further, the controller is configured to perform one or more operations, including but not limited to processing the wind condition(s) for a given time interval, receiving a position of the nacelle, and triggering a yaw untwist operation when the position of the nacelle has rotated from an original position above a predetermined yaw threshold and the processed wind conditions are below a predetermined wind condition threshold. It should be understood that the system may further include any of the additional features as described herein.

In addition, in one embodiment, the system may include a yaw drive mechanism having a yaw drive motor, a yaw drive gearbox, and a yaw drive pinion. As such, the step of monitoring the position of the nacelle may include counting, via the yaw drive mechanism, a number of yaw bearing teeth of a yaw bearing that engage with the yaw drive pinion from the original position.

Further, in certain embodiments, the sensor(s) as described herein may include Micro Inertial Measurement Units (MIMU) sensors, Light Detection and Ranging (LI-DAR) sensors, Sonic Detection and Ranging (SODAR) sensors, wind vanes, anemometers, accelerometers, pressure sensors, strain gauges, angle of attack sensors, vibration sensors, camera systems, fiber optic systems, pitot tubes, rawinsondes, or any other suitable sensors.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for minimizing energy loss caused by yaw untwist of a nacelle of a wind turbine. As used herein, "yaw untwist" generally refers to rotating the nacelle to its original position so as to untwist down-tower cables within the wind turbine tower that have become twisted during rotation of the nacelle. As such, the method includes monitoring one or more wind conditions near the wind turbine and processing the wind condition(s) for a given time interval, e.g. by averaging the wind condition(s) for the given time interval. Further, the method includes monitoring a position of the nacelle and triggering a yaw untwist operation when the position of the nacelle has rotated from an original position above a predetermined yaw threshold (e.g. greater than two revolutions) and the processed wind conditions are below a predetermined wind condition threshold (e.g. during low wind speeds). As such, the present disclosure dynamically monitors and optimizes yaw untwist of the nacelle based on measured and/or forecasted wind speeds and wind direction to minimize production loss.

Figure 1:
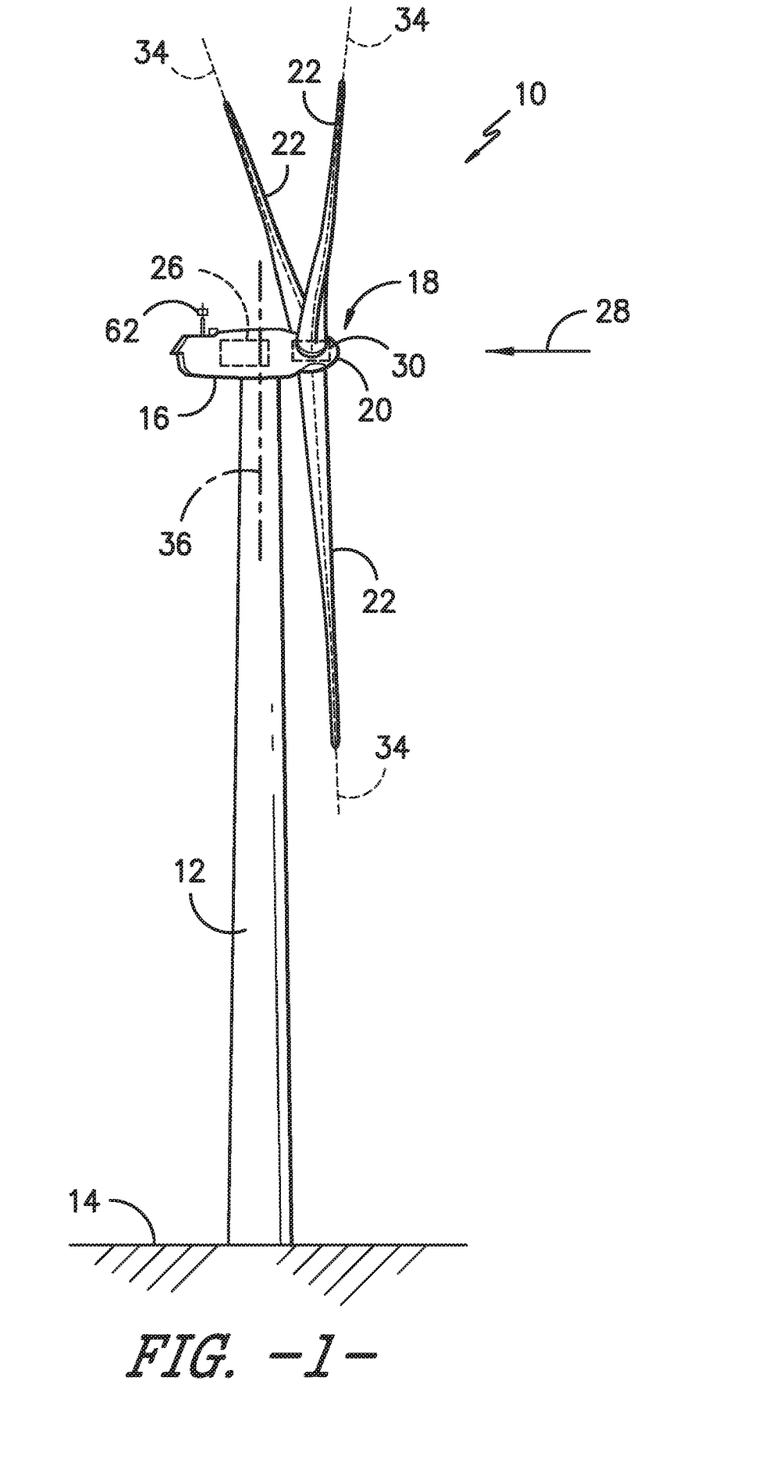
FIG. 1 illustrates a perspective view of one embodiment of a wind turbine according to the present disclosure.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
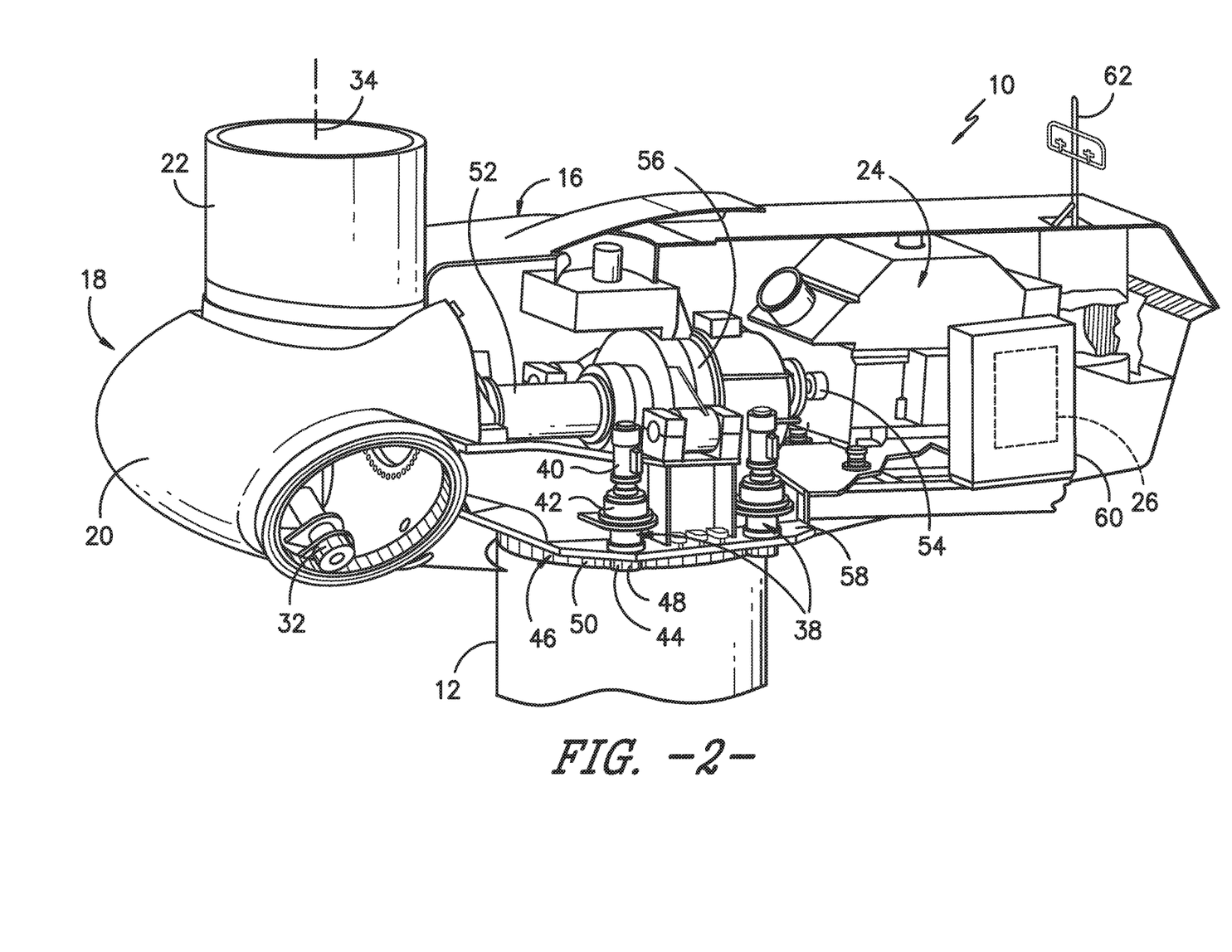
FIG. 2 illustrates a perspective, internal view of one embodiment of a nacelle of a wind turbine according to the present disclosure.

Referring now to FIG. 2, a simplified, internal view of one embodiment of the nacelle 16 is provided to further illustrate various components of the wind turbine 10. As shown, the generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 60 coupled to the hub 20 for rotation therewith. The generator 24 may then be coupled to the main shaft 60 such that rotation of the main shaft 60 drives the generator 24. For instance, in the illustrated embodiment, the generator 24 includes a generator shaft 54 rotatably coupled to the main shaft 60 through a gearbox 56. However, in other embodiments, it should be appreciated that the generator shaft 54 may be rotatably coupled directly to the main shaft 60. Alternatively, the generator 24 may be directly rotatably coupled to the main shaft 60 (often referred to as a "direct-drive wind turbine").

It should be appreciated that the main shaft 60 may generally be supported within the nacelle 16 by a support frame or bedplate 58 positioned atop the wind turbine tower 12. For example, the main shaft 60 may be supported by the bedplate 58 via a pair of pillow blocks mounted to the bedplate 58.

As shown in FIGS. 1 and 2, the wind turbine 10 may also include a turbine control system or a turbine controller 26 centralized within the nacelle 16. For example, as shown in FIG. 2, the turbine controller 26 may be disposed within a control cabinet 60 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10, which is discussed in more detail with reference to FIG. 3 below. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 2) of the wind turbine, or by directly controlling the operation of the plurality of pitch drives or pitch adjustment mechanisms. Specifically, the rotor blades 22 may be rotatably mounted to the hub 20 by one or more pitch bearing(s) (not illustrated) such that the pitch angle may be adjusted by rotating the rotor blades 22 along their pitch axes 34 using the pitch adjustment mechanisms 32.

Further, as the direction 28 of the wind changes, the turbine controller 26 may be configured to control a yaw direction of the nacelle 16 about a yaw axis 36 to position the rotor blades 22 with respect to the direction 28 of the wind. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36. More specifically, as shown in FIG. 2, the yaw drive mechanism 38 may include a yaw drive motor 40, a yaw drive gearbox 42, and a yaw drive pinion 44 that engages a yaw bearing 46. As such, the yaw drive motor 40 drives the yaw drive gearbox 42 which drives the yaw drive pinion 44. Further, the yaw drive pinion 44 generally has a plurality of pinion teeth 48 that engage the gear teeth 50 of the yaw bearing 46 so as to rotate the bearing 46 about the yaw axis 36. Accordingly, the yaw drive mechanism 38 is configured to continuously yaw the nacelle 16 of the wind turbine 10 such that the nacelle 16 faces the incoming wind 28 and maximizes power.

As further shown in FIG. 2, a wind sensor 62 may be provided on the wind turbine 10. The wind sensor 62, which may for example be a wind vane or an anemometer, may measure wind speed and/or direction. Further, in certain embodiments, the wind sensor 62(s) as described herein may also include Light Detection and Ranging (LIDAR) sensors, Micro Inertial Measurement Units (MIMU) sensors, Sonic Detection and Ranging (SODAR) sensors, accelerometers, pressure sensors, strain gauges, angle of attack sensors, vibration sensors, camera systems, fiber optic systems, pitot tubes, rawinsondes, or any other suitable sensors. The wind sensor 62 may further be in communication with the controller 26, and may provide such speed and direction information to the controller 26. For example, yawing of the wind turbine 10 may occur due to sensing of changes in the wind direction 28, in order to maintain alignment of the wind turbine 10 with the wind direction 28.

Figure 3:
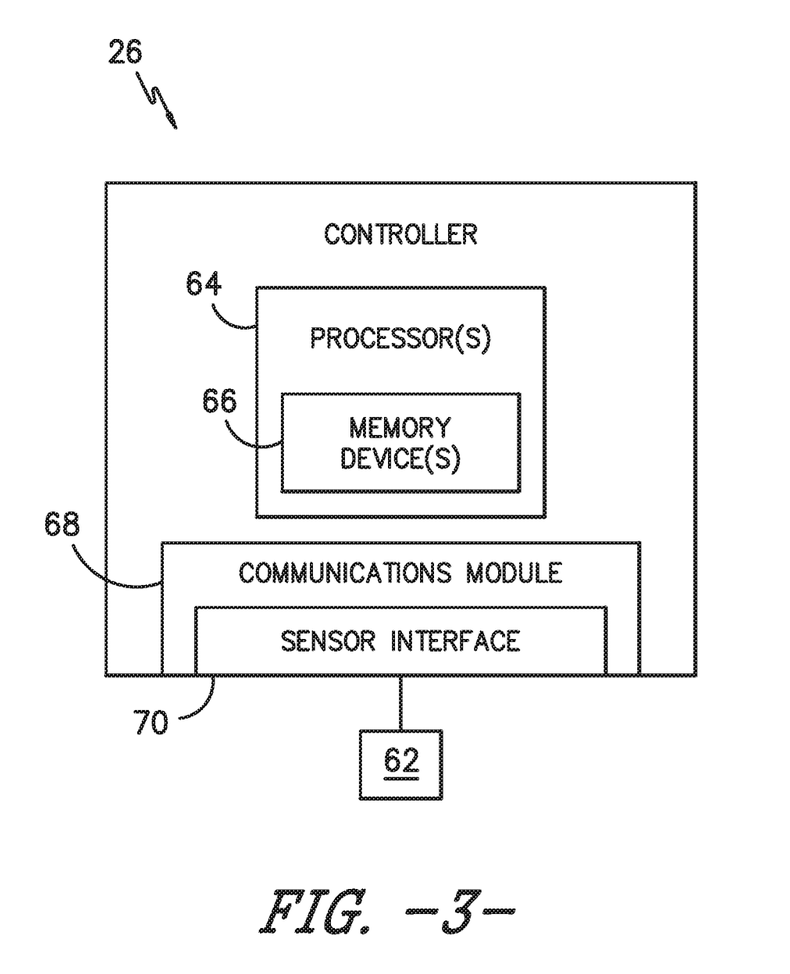
FIG. 3 illustrates a block diagram one embodiment of suitable components that may be included in a controller according to the present disclosure.

Referring particularly to FIG. 3, various components that may be included in one embodiment of the turbine controller 26 (or any other controller of the wind turbine 10) are illustrated. For example, as shown, the controller 26 may include one or more processor(s) 64 and associated memory device(s) 66 configured to perform a variety of computer-implemented functions (e.g., performing the methods, steps, calculations and the like and storing relevant data as disclosed herein). Additionally, the controller 26 may also include a communications module 68 to facilitate communications between the controller 26 and the various components of the wind turbine 10, e.g. any of the components of FIG. 2. Further, the communications module 68 may include a sensor interface 70 (e.g., one or more analog-to-digital converters) to permit signals transmitted from one or more sensors to be converted into signals that can be understood and processed by the processor(s) 64. It should be appreciated that the sensor(s) 62 described herein may be communicatively coupled to the communications module 68 using any suitable means. For example, as shown in FIG. 3, the sensor(s) 62 may be coupled to the sensor interface 70 via a wired connection. However, in other embodiments, the sensors may be coupled to the sensor interface 70 via a wireless connection, such as by using any suitable wireless communications protocol known in the art. As such, the processor(s) 64 may be configured to receive one or more signals from the sensor(s) 62.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 66 of the turbine controller 26 and/or pitch and yaw controllers may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 66 may generally be configured to store suitable computer-readable instructions that, when implemented by the processor(s) 64 configure the turbine controller 26 and/or yaw controllers to perform various computer-implemented functions. In addition, the turbine controller 26 and/or yaw controllers may also include various input/output channels for receiving inputs from sensors and/or other measurement devices and for sending control signals to various components of the wind turbine 10.

As discussed above, the wind turbine 10, such as the nacelle 16 thereof, may rotate about the yaw axis 36 as required. More specifically, as shown in FIG. 1, the yaw axis 36 may generally extend along (and be coaxial with) a longitudinal axis of the tower 12. In particular, as mentioned, rotation about the yaw axis 36 may occur due to changes in the wind direction 28, such that the rotor 18 is aligned with the wind direction 28. Since the wind direction 28 may change during operation of the wind turbine 10, the controller 26 or the yaw controller(s) may adjust the nacelle 16 by rotating the nacelle 16 about the yaw axis 36. When the yaw angle of the nacelle 16 is adjusted, however, cables extending from the nacelle 16 down through the tower 12 (generally referred to as "down-tower cables") can become twisted. Previous control logics for untwisting the cables included rotating the nacelle 16 back to its original position once rotation of the nacelle 16 reached a limit switch (e.g. two revolutions from its original position). Once the limit switch was activated, untwisting of the nacelle 16 required considerable time to return to its original position (e.g. up to or more than 20 minutes). Thus, power generated by the wind turbine 10 during such yaw untwisting was unnecessarily reduced during this time frame.

Figure 4:
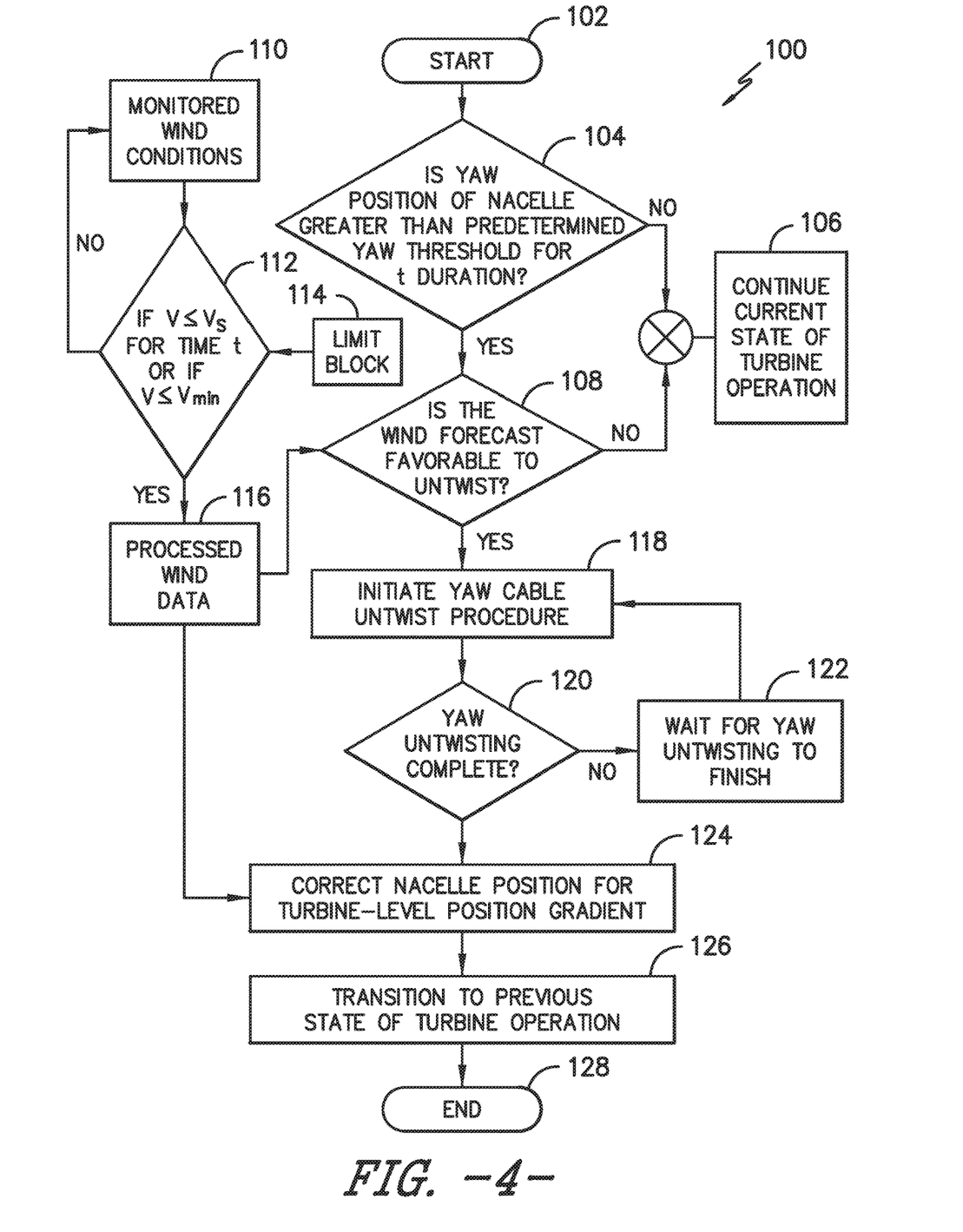
FIG. 4 illustrates a detailed flow diagram of one embodiment of a method for minimizing energy loss caused by yaw untwist of a nacelle of a wind turbine according to the present disclosure.
Figure 5:
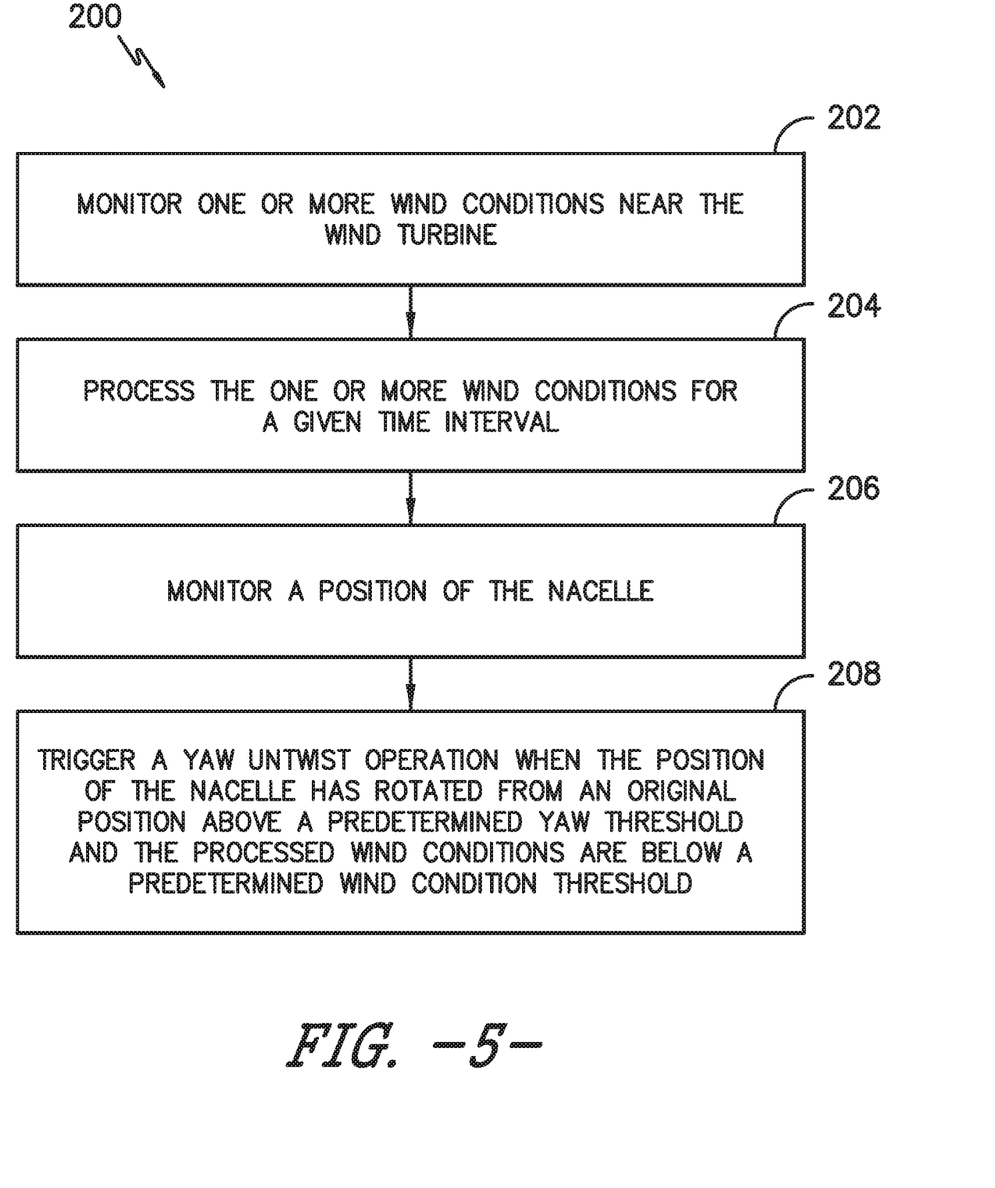
FIG. 5 illustrates a simplified flow diagram of another embodiment of a method for minimizing energy loss caused by yaw untwist of a nacelle of a wind turbine according to the present disclosure.

As such, FIGS. 4 and 5 illustrate various flow diagrams of methods 100, 200 for minimizing energy loss caused by yaw untwist of the nacelle 16 of the wind turbine 10 according to embodiments of the present disclosure. More specifically, as shown in FIG. 4, the method 100 starts at 102. As shown at 104, the controller 26 determines whether the yaw position of the nacelle 16 is greater than a predetermined yaw threshold for a certain duration of time, t. In certain embodiments, the predetermined yaw threshold of the nacelle 16 may range from about 360 degrees (i.e. about one (1) revolution) to about 720 degrees (i.e. about two (2) revolutions). As such, in certain embodiments, the controller 26 may receive a signal from a limit activation switch that indicates whether the yaw position is greater than the predetermined yaw threshold. If the yaw position of the nacelle 16 is less than the predetermined yaw threshold, the method 200 continues the current state of operation as shown at 106. If the yaw position of the nacelle 16 is greater than the predetermined yaw threshold, the controller 26 can then determine whether the wind forecast is favorable to untwist as shown at 108.

More specifically, as shown at blocks 110-116, the controller 26 may process one or more wind conditions near the wind turbine 10 to determine whether the wind forecast is favorable to untwisting of the nacelle 16 (i.e. the wind speed is low, thereby resulting in minimal power loss). For example, in certain embodiments, the wind condition(s) may include an actual wind speed, a forecasted wind speed, an actual wind direction, a forecasted wind direction, or any other suitable wind condition. For example, as shown at 110, the wind conditions are monitored. As shown at 112, if the average wind speed (e.g. V) for a predetermined time period, t, is less than a wind speed (e.g. $V_S$) at which untwisting can start, then the processed wind data 116 indicates that the wind forecast is favorable. Similarly, if the average wind speed (e.g. V) for a predetermined time period, t, is less than a measured minimum average (t) wind speed (e.g. $V_{MIN}$) for a predetermined time period, t, then the processed wind data 116 may also indicate that the wind forecast is favorable. In addition, as shown at 114, the method 100 may include a limit block for determining the measured minimum average (t) wind speed $V_{MIN}$.

As shown at 118, once the controller 26 determines that the wind forecast is favorable to untwist, the controller 26 is then configured to initiate a yaw cable untwist procedure. As shown at 120, the controller 26 is further configured to monitor when the yaw cable untwist procedure is complete before taking further action. For example, as shown at 122, the controller 26 is configured to wait for the yaw cable untwist procedure to finish before moving forward to blocks 124-128. Once completed, as shown at 124, the controller 26 may further correct the position of the nacelle 16 for a turbine-level position gradient, e.g. based on the processed wind data. In another embodiment, as shown at 126, the controller 26 may also transition to a previous state of turbine operation after completion of the yaw twist operation. At 128, the method 200 ends.

Referring particularly to FIG. 5, a simplified flow diagram of another embodiment of a method 100 for minimizing energy loss caused by yaw untwist of the nacelle 16 of the wind turbine 10 according to the present disclosure is illustrated. More specifically, as shown at 202, the method 200 includes monitoring, via at least on sensor (e.g. sensor 62), one or more wind conditions near the wind turbine 10. Further, as shown at 204, the method 200 includes processing the wind condition(s) for a given time interval. More specifically, in one embodiment, the controller 26 may be configured to process the wind condition(s) by determining an average wind condition for the given time interval as a function of the wind condition(s) and determining whether the average wind condition for the given time interval is less than at least one of a predetermined yaw untwist wind condition or a minimum wind condition for the given time interval.

In addition, as shown at 206, the method 200 includes monitoring a position of the nacelle 16. For example, in particular embodiments, the controller 26 may monitor the position of the nacelle 16 by determining an angle of the nacelle 16 measured from the original position. As used herein, the original position may generally correspond to a zero-degree north location of the nacelle 16. As such, the zero-degree north location may be determined at installation of the turbine 10 and pre-programmed into the controller 26 to provide a reference point for measuring rotation of the nacelle 16. Thus, in one embodiment, the controller 26 can set a predetermined threshold for the angle of the nacelle 16 such that if rotation exceeds the threshold, the controller 26 can trigger a yaw untwist operation or process as described herein. More specifically, as mentioned, the predetermined yaw threshold for the angle of the nacelle 16 may range from about 360 degrees (i.e. about one (1) revolution) to about 720 degrees (i.e. about two (2) revolutions). In additional embodiments, the controller 26 may monitor the position of the nacelle 16 by counting, via the yaw drive mechanism 38, a number of yaw bearing teeth 50 of the yaw bearing 46 that engage with the yaw drive pinion 44 from the original position.

As shown at 208, the method 200 includes triggering a yaw untwist operation when the position of the nacelle 16 has rotated from an original position above a predetermined yaw threshold and the processed wind conditions are below a predetermined wind condition threshold. More specifically, in certain embodiments, triggering the yaw twist operation may include untwisting the nacelle 16 of the wind turbine 10 to its original position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for minimizing energy loss caused by yaw untwist of a nacelle of a wind turbine, the method comprising:

monitoring, via at least one sensor, one or more wind conditions near the wind turbine;

processing, via a controller, the one or more wind conditions for a given time interval, wherein processing the one or more wind conditions comprises:

determining an average wind condition for the given time interval as a function of the one or more wind conditions; and determining whether the average wind condition for the given time interval is less than at least one of a predetermined yaw untwist wind condition or a minimum wind condition for the given time interval;

monitoring, via the controller, a position of the nacelle; and triggering, via the controller, a yaw untwist operation of a yaw drive mechanism for adjusting the position of the nacelle when the position of the nacelle has rotated from an original position above a predetermined yaw threshold and the processed wind conditions are below a predetermined wind condition threshold so as to untwist cables that became twisted during yawing of the nacelle.

2. The method of claim 1, wherein the one or more wind conditions comprise at least one of an actual wind speed, a forecasted wind speed, an actual wind direction, or a forecasted wind direction.

3. The method of claim 1, wherein triggering the yaw twist operation further comprises untwisting the nacelle of the wind turbine to its original position.

4. The method of claim 1, wherein monitoring the position of the nacelle further comprises determining an angle of the nacelle measured from the original position, the original position corresponding to a zero-degree north location of the nacelle.

5. The method of claim 4, wherein the predetermined yaw threshold comprises an angle of the nacelle ranging from about 360 degrees to about 720 degrees.

6. The method of claim 1, wherein monitoring the position of the nacelle further comprises counting, via the yaw drive mechanism, a number of yaw bearing teeth of a yaw bearing that engage with a yaw drive pinion from the original position.

7. The method of claim 1, further comprising determining, via the controller, whether the yaw untwist operation is complete and after completion, correcting the position of the nacelle for a turbine-level position gradient.

8. The method of claim 7, further comprising transitioning to a previous state of turbine operation after completion of the yaw twist operation.

9. A system for minimizing energy loss caused by yaw untwist of a nacelle of a wind turbine, the system comprising:
   a yaw drive mechanism for adjusting a position of the nacelle;
   at least one sensor configured to monitor one or more wind conditions near the wind turbine; and
   a controller having one or more processors communicatively coupled to the at least one sensor, the controller configured to perform one or more operations, the one or more operations comprising:
      processing the one or more wind conditions for a given time interval, wherein processing the one or more wind conditions comprises:
         determining an average wind condition for the given time interval as a function of the one or more wind conditions; and
         determining whether the average wind condition for the given time interval is less than at least one of predetermined yaw untwist wind condition or minimum wind condition for the given time interval;
      receiving the position of the nacelle; and
      triggering a yaw untwist operation of the yaw drive mechanism when the position of the nacelle has rotated from an original position above a predetermined yaw threshold and the processed wind conditions are below a predetermined wind condition threshold.

10. The system of claim 9, wherein the one or more wind conditions comprise at least one of an actual wind speed, a forecasted wind speed, an actual wind direction, or a forecasted wind direction.

11. The system of claim 9, wherein monitoring the position of the nacelle further comprises determining an angle of the nacelle measured from the original position, the original position corresponding to a zero-degree north location of the nacelle.

12. The system of claim 11, wherein the predetermined yaw threshold comprises an angle of the nacelle ranging from about 360 degrees to about 720 degrees.

13. The system of claim 9, wherein the yaw drive mechanism comprises a yaw drive motor, a yaw drive gearbox, and a yaw drive pinion, wherein monitoring the position of the nacelle further comprises counting, via the yaw drive mechanism, a number of yaw bearing teeth of a yaw bearing that engage with the yaw drive pinion from the original position.

14. The system of claim 9, wherein triggering the yaw twist operation further comprises untwisting the nacelle of the wind turbine to its original position.

15. The system of claim 9, wherein the one or more operations further comprises determining whether the yaw untwist operation is complete and after completion, correcting the position of the nacelle for a turbine-level position gradient.

16. The system of claim 15, wherein the one or more operations further comprises transitioning to a previous state of turbine operation after completion of the yaw twist operation.

17. The system of claim 9, wherein the at least sensor comprises at least one of Micro Inertial Measurement Units (MIMU) sensors, Light Detection and Ranging (LIDAR) sensors, Sonic Detection and Ranging (SODAR) sensors, wind vanes, anemometers, accelerometers, pressure sensors, strain gauges, angle of attack sensors, vibration sensors, camera systems, fiber optic systems, picot, tubes, or rawinsondes.

* * * * *